Patented Sept. 26, 1939

2,174,278

UNITED STATES PATENT OFFICE 2,174,278

METHOD FOR MAKING ALKYL HALIDES

Ober C. Slotterbeck and Raphael Rosen, Elizabeth, N. J., assignors to Standard Oil Development Company, a corporation of Delaware No Drawing. Application June 4, 1937, Serial No. 146,370

7 Claims. (Cl. 260—663)

The present invention relates to an improved method for producing alkyl halides and more specifically to an improved method for bringing about the catalytic reaction between olefins and hydrogen halides. The invention will be fully understood from the following description:

Alkyl halides have been made by direct reaction of olefins, such as propylene, butylene and the like, with hydrogen halides, but ethyl chloride is notably difficult to form so that active catalysts are necessary. The catalysts which have been most used in this connection are the anhydrous halides of the Friedel craft type, such as aluminum chloride, zinc chloride, bismuth chloride and other halides of the 5th group metals. The mixed reactants are passed over the catalyst in gas phase at a temperature of about 100° to 250° C. and the product which comprises the alkyl chloride is condensed from the effluent gases.

It has been found that although the halide catalysts of the 5th group metals are quite active, they are not of practical importance when used in the manner previously disclosed because of the fact that their activity is lost very quickly. In other words, the yield of alkyl halide is very high for a limited period, but rapidly decreases as the catalyst deteriorates. The present inventors have found that small amounts of moisture are necessary for the activity of the catalyst since otherwise during the process the catalyst is gradually dried so that it looses its activity. In this respect the 5th group halides differ from most of the well known Friedel craft catalysts which must be anhydrous. The present inventors do not wish to be limited to any theory of cause of this loss of activity but they believe that the active catalyst itself is an unstable addition compound formed by the addition of water to the metal halide. Bismuth chloride and other halides of the same group are capable of hydrolyzing to form oxy halides, which are likewise found to be substantially inactive, and for this reason the presence of a large amount of water in the catalyst is also undesirable. However, they have found that relatively small amounts of water are capable of regenerating a substantially dried bismuth chloride catalyst while, on the other hand, the oxy chloride can be regenerated by continued reaction with a dry halogen halide.

The inventors have found that water vapor may be added to the reactants, that is to the olefin and the hydro halide and that in this manner the activity of the catalyst may be maintained over relatively long periods of time. The water may, of course, be added directly to the catalyst either continuously or from time to time or may be added to the reactants at intervals, but it is more satisfactory to add a small quantity of steam or water vapor to the mixed inlet gases in a continuous manner. If too much water be added to the catalyst, it will become inactive and the yield of the alkyl halide will decrease. Similarly, if too little water be added, the catalyst will gradually be dried and the yield will also decrease. There is an optimum amount of water which will maintain the catalyst in its most active form. The amount of water to be added varies somewhat with the conditions of operation and an equilibrium is evidently established between the amount of water lost by evaporation from the catalyst and that which is added. To maintain the equilibrium requires that more water be added as the temperature increases, but in any case the amount is not large. For example, 2.5 to 20% of water, and preferably 10 to 15%, of water added to the mixed reaction gases has been found to maintain activity over relatively long periods. Ordinarily the reaction gases are used in equal volume but the proportion of either the one or the other may be increased. Likewise the reactor may be conducted at normal atmospheric pressure or at increased or reduced pressures.

The present invention will be fully understood from the following examples:

Example I

Bismuth chloride was impregnated on an asbestos carrier and was carefully dried in hydrogen chloride gas for a period of six hours at 200° C. The catalyst was then packed in a 95 cm. tube and a mixture of equal volumes of ethylene and hydrogen chloride gas was passed through the tube at a rate of 40 to 50 litres of the mixture per hour. The temperature was varied from 130 to 200° C. in different runs which lasted for 15 to 30 minutes respectively. In none of these runs, however, was any ethyl chloride produced by the reaction.

Example II

A bismuth chloride catalyst was prepared in substantially the same manner as the catalyst used in the previous example, except that in this case the drying at 200° C. was eliminated. Using a temperature of 200 to 210° C. one run was conducted for a period of 20 minutes and ethyl chloride collected amounted to 74% conversion of the initial materials.

In a second run, lasting for 20 minutes, under substantially the same conditions, the yield of ethyl chloride amounted to 45% and with longer runs the yields became continually smaller.

The above experiments indicate that the activity is high during the first portion of the run but gradually declines as the water is removed from the catalyst. Small amounts of water were found in the reaction products, although the incoming gases were dry.

Example III

A series of runs was made as above except that the volume of the gas mixture was now 20 litres per hour and the temperature was 200° C. Over the first 40 minutes of operation, the conversion to ethyl chloride averaged 72%. Over the next 40 minutes, it was found to have dropped to 57%. During the next 40 minute period, the yield was 46% and during the next 60 minutes, it had fallen to 41%. During the final period of 40 minutes, the yield was only 18%.

The initial gases were now bubbled through sulfuric acid of 55% strength at 24° C. temperature so as to permit the water vapor to be picked up by the gas in proportion of approximately 1% water vapor on the mixed gas. During an operating period of 60 minutes, the yield of ethyl chloride rose from the previous 18% to 31%. The acid strength was now changed to 35% so that the amount of water picked up by the gases amounted to 2.6% and the yield was found to rise to 38%.

Reaction gases were then diverted from the sulfuric acid bottles so that no water was added and during the subsequent period of operation the yield of ethyl chloride dropped first to 26% and then to 23%.

Example IV

A series of runs was made passing mixtures of ethylene and hydrogen chloride containing 10% of water vapor over bismuth chloride impregnated on an asbestos carrier. The temperature was from 200 to 220° C. in the first run of 135 minutes and a yield of 53% ethyl chloride was obtained. The next run for 150 minutes gave 69%. The source of the gases was then changed and over the next 150 minutes the yield was 58%, but during the subsequent period of 120 minutes it raised to 71% and showed no tendency to decrease so long as the moisture content of the gas was maintained.

Example V

BiOCl was impregnated on an asbestos carrier and dried over night under vacuum at 110° C. It was then heated for 2 hours at 220° C. This mass was then packed into the tube used for the prior experiments and was maintained at a temperature from 210° to 220° C., while a gas mixture containing ethylene and hydrogen chloride was passed through the tube. The volume of gas would flow 12 to 14½ litres per hour. The yield of ethyl chloride was 36% during the first hour and water was found in the efflux gases. During the next two hours, the yield of ethyl chloride rose to a maximum of 47% and then gradually declined. In attempting to make a balance of the materials entering with the materials leaving the reactor, it was found that the chlorine entering as hydrochloric acid was greater than the amount leaving as hydrochloric acid and ethyl chloride by an amount approximately sufficient to convert the entire quantity of bismuth oxy chloride to bismuth chloride.

The present invention is not limited to any theory of the mechanism of the reaction nor to any particular catalyst, method of manufacture or the like, nor to any particular method of adding water to the catalyst, but only to the following claims in which it is desired to claim all novelty inherent in the invention.

We claim:

1. An improved process for producing alkyl halides comprising passing an olefin and a hydrogen halide over a catalyst comprising a halide of a metal of the 5th group while maintaining between 2½% and 20% of moisture in the feed gases.

2. Process according to claim 1 in which moisture is added to the catalyst to maintain its activity.

3. Process according to claim 1 in which water is continuously added to the catalyst in quantities sufficient to maintain its activity.

4. Process of producing alkyl halides comprising passing a mixture of ethylene and hydrogen halide containing moisture over a catalyst comprising a halide of a 5th group metal maintained at reaction temperature and adjusting the amount of moisture in the inlet gases to between 2½% and 20%.

5. Process according to claim 4 in which ethylene and a halogen halide are passed over a bismuth chloride catalyst.

6. Process according to claim 4 in which ethylene and hydrogen chloride are passed over a bismuth chloride catalyst.

7. Process according to claim 4 in which a halogen halide and ethylene are passed over a bismuth chloride catalyst maintained at a temperature in the range from 100° to 250° C.

OBER C. SLOTTERBECK.
RAPHAEL ROSEN.